United States Patent [19]

Zabrenski

[11] Patent Number: 4,840,195
[45] Date of Patent: Jun. 20, 1989

[54] PISTON-BACKED GAS PRESSURE REGULATOR

[75] Inventor: John S. Zabrenski, Allentown, Pa.

[73] Assignee: Air Products and Chemicals, Inc., Allentown, Pa.

[21] Appl. No.: 122,959

[22] Filed: Nov. 19, 1987

[51] Int. Cl.$^4$ .......................................... G05D 16/06
[52] U.S. Cl. ................................. 137/312; 137/505.3; 137/505.42; 137/557
[58] Field of Search ............... 137/505.3, 505.42, 557, 137/505.38, 312

[56] References Cited

U.S. PATENT DOCUMENTS

| | | | |
|---|---|---|---|
| 1,042,745 | 10/1912 | Zahm . | |
| 2,035,151 | 3/1936 | Eches | 56/5 |
| 2,147,850 | 2/1939 | MacLean | 50/21 |
| 2,691,773 | 10/1954 | Lichtenberger | 340/242 |
| 3,131,638 | 5/1954 | Ellison et al. | 103/44 |
| 3,661,060 | 5/1972 | Bowen | 92/102 |
| 3,952,691 | 4/1976 | Peltz et al. | 137/557 X |
| 4,010,769 | 3/1977 | DeLorenzo et al. | 137/312 |
| 4,272,959 | 6/1981 | Yamane | 60/602 |

FOREIGN PATENT DOCUMENTS

| | | | |
|---|---|---|---|
| 451021 | 9/1948 | Canada | 137/557 |
| 1943551 | 4/1971 | Fed. Rep. of Germany | 137/505.3 |
| 197712 | 12/1977 | U.S.S.R. | 137/505.42 |
| 430190 | 6/1935 | United Kingdom | 137/505.3 |

*Primary Examiner*—Stephen Hepperle
*Attorney, Agent, or Firm*—James C. Simmons; William F. Marsh

[57] ABSTRACT

A gas pressure regulator including a housing having a high pressure chamber into which the gas to be regulated is fed, a low pressure chamber, and an orifice between the high pressure chamber and the low pressure chamber. A bonnet is mounted on the housing across the low pressure chamber. A flexible diaphragm is mounted across the low pressure chamber and separates the low pressure chamber from the bonnet. A rod extends through the orifice and connects the flexible diaphragm to a valve plug in the high pressure chamber so that movement of the flexible diaphragm moves the valve plug toward and away from the orifice. A rigid piston is slidable mounted in the bonnet. A spacer connects the flexible diaphragm and the rigid piston in spaced relation to provide a chamber therebetween. An adjustment stem having a knob on its end is threaded through the bonnet and a spring is compressed between the adjustment stem and the piston. A pressure sensor is mounted on the bonnet at the chamber between the flexible diaphragm and the rigid piston to indicate any change in pressure in the chamber as a result of leakage across the flexible diaphragm.

9 Claims, 4 Drawing Sheets

PISTON-BACKED GAS PRESSURE REGULATOR

FIELD OF INVENTION

The present invention relates to a gas pressure regulator, and more particularly to a piston backed flexible diaphragm gas pressure regulator.

BACKGROUND OF THE INVENTION

Compressed gas regulators operate by reducing a high pressure gas through a variable orifice to a lower delivery pressure. As the pressure of the source drops, the regulator's control valve is automatically adjusted by a pressure sensing element to maintain a constant discharge pressure. The pressure sensing element can be a piston or a flexible diaphragm. Flexible diaphragms are generally preferred for low discharge pressures (less than 200 psig) because they provide more sensitive pressure control compared to pistons, which are rigid diaphragms, of equal area. In order to function adequately, a diaphragm must be thin enough to flex at the operating pressure of the regulator. This also means it must be highly stressed under normal operating conditions.

A major operational problem of flexible diaphragm regulators is rupture of the diaphragm, which can cause loss of the gas into the atmosphere. Diaphragms rupture for various reasons including: weakening caused by fatigue, buckling caused by overpressurization, and loss of strength due to corrosion. Whatever the cause, a ruptured diaphragm results in the loss of pressure control as well as a discharge through the regulator's bonnet. This discharge is not a safety problem for ordinary inert gases, such as nitrogen, argon, or helium, provided that local ventilation is adequate to prevent asphyxiation. However, discharge of toxic, flammable, or corrosive gases into the working area is extremely dangerous. Gases can also escape through the bonnet by leaking through the diaphragm seal. Although this type of discharge is slower than one caused by a diaphragm rupture, it still can be a safety problem for flammable or toxic gases.

Several approaches have been used to manage gas discharges caused by ruptured or leaking diaphragms. These include: captured vent bonnets, piston pressure sensing elements, double diaphragm, and piston-backed diaphragms. Captured vent bonnets are the most common method of managing gas releases caused by diaphragm failures. In a captured vent regulator, the feedthrough for the adjusting knob on the regulator is sealed so as to be gas tight, and a vent line is provided from the bonnet to carry away any leakage. This type of regulator has the benefit of simplicity, but requires installation of a separate vent line that must be piped to a safe discharge location.

A piston controlled regulator is essentially the same as a flexible diaphragm regulator except that the flexible diaphragm is replaced by a piston capable of withstanding full cylinder pressure. The piston moves in the regulator, rather than flexing, and has a dynamic seal, such as an O-ring, between it and the inside wall of the bonnet. While the piston, which is rigid, does not rupture, leaks can occur at the O-ring seal. Overall, the reliability of the piston is higher than the flexible diaphragm with respect to leaks into the bonnet. The major disadvantage of the piston controlled regulator is low sensitivity relative to a flexible diaphragm of equal area. To compensate for this, a much larger piston diameter is required relative to a flexible diaphragm controlled regulator. This makes the piston controlled regulator large in size and more expensive than the flexible diaphragm controlled regulator.

A double flexible diaphragm regulator, such as shown in U.S. Pat. Nos. 1,042,745 to E. Zahm, issued Oct. 29, 1912; 2,035,151 to G. P. Eches, issued Mar. 24, 1936; 2,147,850, to A. D. MacLean, issued Feb. 21, 1939; and 4.010,769, to B. L. DeLorenzo et al, issued Mar. 8, 1977 include a pair of spaced flexible diaphragms with a chamber therebetween. However, these regulators either do not include means for determining when a diaphragm has failed, or vents the leaking gas to the atmosphere. The later can be dangerous if the gas is toxic or flammable. As shown in U.S. Pat. Nos. 2,691,773, to H. V. Lichtenberger, issued Oct. 12, 1954, 3,131,638, to L. F. Wilson et al, issued May 5, 1964 and 3,661,060, to J. C. Bowen, issued May 9, 1972, there are double diaphragm devices which have means for detecting a leak through one of the diaphragms. However, these devices are not pressure regulators. Also, although a diaphragm controlled pressure control device having means for detecting failure of the diaphragm is shown in the U.S. Pat. No. 4,272,959, to K. Yamane, issued June 16, 1981, this device is complex and expensive to manufacture.

The piston-backed, flexible diaphragm controlled regulator overcomes the sensitivity problem of the piston controlled regulator and the reliability problem of a flexible diaphragm controlled regulator. In this type of regulator, a flexible diaphragm and piston are combined in series with the piston contacting the diaphragm on the low pressure side thereof. The flexible diaphragm provides sensitive pressure control, while the backup piston prevents leaks through the bonnet should the flexible diaphragm fail. Both the diaphragm and piston seals must simultaneously fail in order for gas to escape through the bonnet. In addition to high reliability of the pressure sensing element, the piston and diaphragm regulator preserves operability during a diaphragm failure. One disadvantage of the piston-backed diaphragm regulator is that there is no external indication of a diaphragm failure. Except for subtle changes in operating characteristics, the user would not be aware that he is operating with the backup piston. Thus, failure of the O-ring seal on the piston would allow gas to vent through the bonnet. Therefore, it would be desirable to have a piston-backed flexible diaphragm pressure regulator which would indicate failure of the flexible diaphragm to allow the user to take necessary steps to fix the regulator before the piston seal began to leak.

SUMMARY OF THE INVENTION

A gas pressure regulator includes a housing having a high pressure chamber, a low pressure chamber, an orifice between the high pressure chamber, and a bonnet across the low pressure chamber. A valve plug is in the high pressure chamber and is movable toward and away from the orifice to close and open the regulator. Control means is across the low pressure chamber and is connected to the valve plug to move the valve plug. The control means includes a flexible diaphragm across the low pressure chamber, a rigid diaphragm sealing mounted across the bonnet spaced from the flexible diaphragm and forming a chamber therebetween. The two diaphragms are connected together so as to move together, and means is provided in the chamber between the diaphragms to indicate any leaking across the flexible diaphragm into the chamber.

DETAILED DESCRIPTION OF PREFERRED EMBODIMENT

Figure 1:
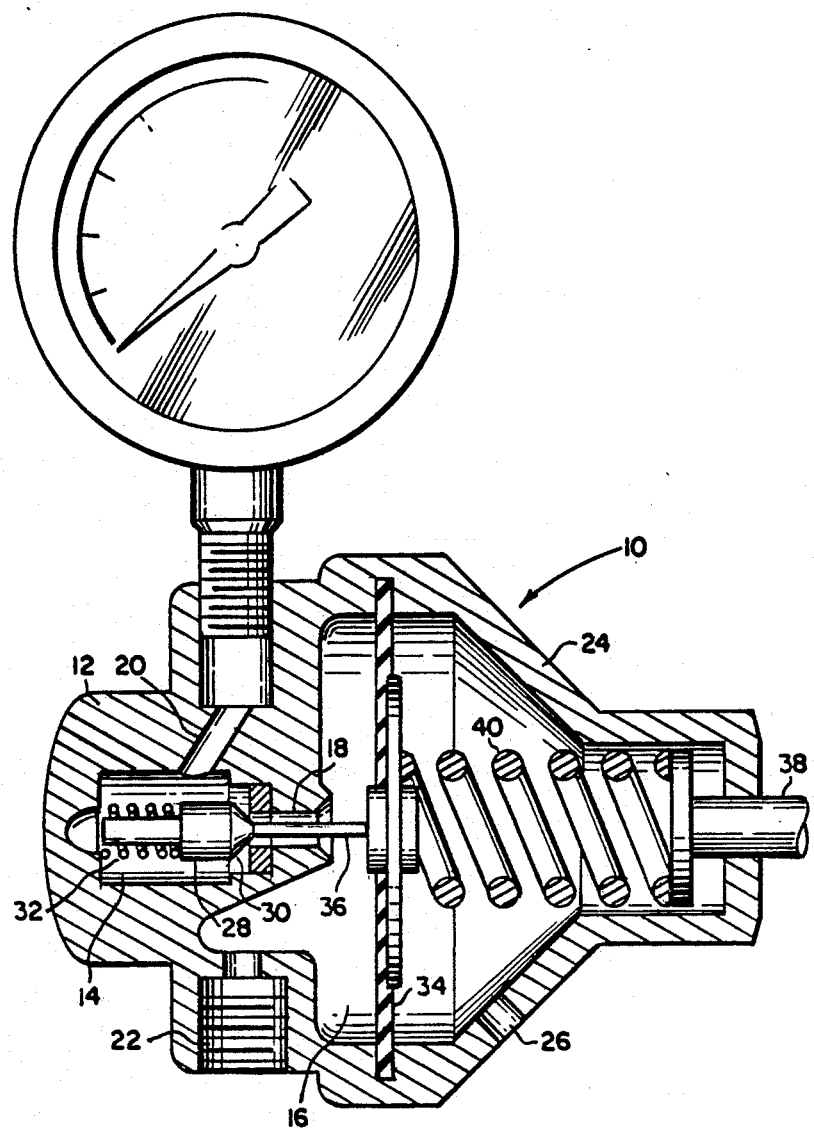
FIG. 1 is a sectional view of a form of a flexible diaphragm controlled pressure regulator of the prior art.

Referring initially to FIG. 1, a flexible diaphragm controlled pressure regulator of the prior art is generally designed as 10. Pressure regulator 10 includes a housing 12 having a high pressure chamber 14, a low pressure chamber 16 spaced from the high pressure chamber 14, and an orifice 18 extending between the high pressure chamber 14 and the low pressure chamber 16. An inlet port 20 extends through the housing 12 to the high pressure chamber 14, and an outlet port 22 extends through the housing 12 to the low pressure chamber 16. A hollow bonnet 24 is mounted on the housing 12 across the low pressure chamber 16. The bonnet 24 has a vent opening 26 therethrough.

A valve plug 28 is in the high pressure chamber 14 and has a conical seating surface 30 facing the orifice 18. A spring 32 is compressed between the valve plug 28 and the bottom of the high pressure chamber 14 urging the valve plug 28 toward the orifice 18. A flexible diaphragm 34 extends across the low pressure chamber 16 and is clamped at its periphery between the bonnet 24 and the housing 12. The diaphragm 34 separates the low pressure chamber 16 from the interior of the bonnet 24. A rod 36 connects the diaphragm 34 with the valve plug 28 so that the diaphragm 34 can move the valve plug 28 toward and away from the orifice 18. An adjustment stem 38 is threaded through the end of the bonnet 24, and has a knob, not shown, on its end by which the stem 38 can be rotated. A spring 40 is compressed between the diaphragm 34 and the adjustment stem 38.

In the operation of the regulator 10, the adjustment stem 38 is rotated by the knob to provide a desired force of the spring 40 on the diaphragm 34. If the force of the spring 40 on the diaphragm 34 is greater than the pressure of the gas in the low pressure chamber 16, the diaphragm 34 will move the valve plug 28 away from the orifice 18 allowing gas to flow from the high pressure chamber 14 to the low pressure chamber 16 and out through the outlet port 22. The conical surface 30 of the valve plug 28 reduces the pressure of the gas as it passes through the orifice 18. If the pressure of the gas in the low pressure chamber 16 becomes higher than the force of the spring 40 on the diaphragm 34, the diaphragm will move the valve plug 28 closer to the orifice so as either to reduce the size of the opening, thereby reducing the pressure of the gas flowing into the low pressure chamber 16, or closing the orifice 18 completely. Thus, the pressure of the gas passing through the regulator is controlled. If the diaphragm ruptures, the path of least resistance is through the opening in the diaphragm 34 into the valve bonnet 24 and out into the atmosphere through the vent opening 26.

Figure 2:
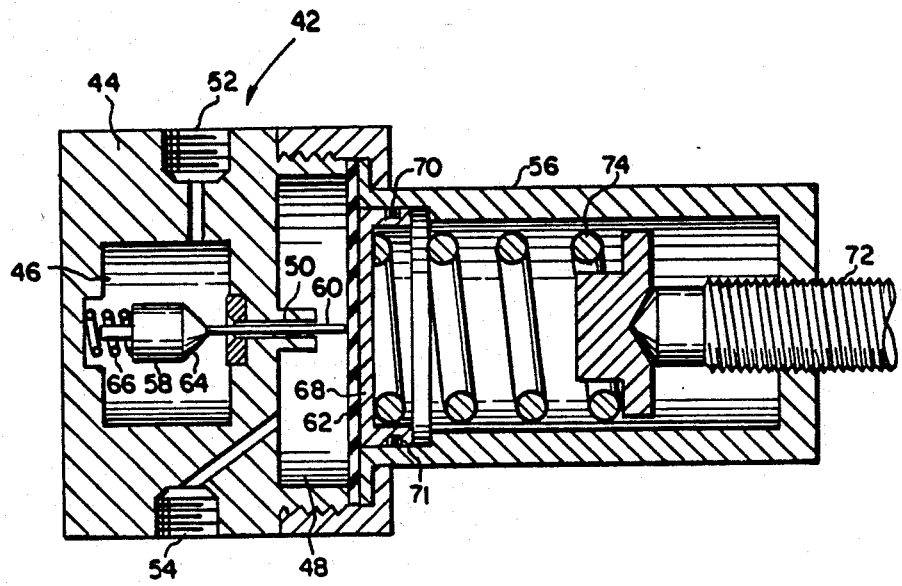
FIG. 2 is a sectional view of a form of a piston-backed, flexible diaphragm controlled pressure regulator of the prior art.

Referring to FIG. 2, a piston-backed, flexible diaphragm controlled regulator of the prior art is generally designated as 42. Regulator 42 is similar to the flexible diaphragm controlled regulator 10 shown in FIG. 1 in that it includes a housing 44 a high pressure chamber 46, a low pressure chamber 48 spaced from the high pressure chamber 46, and an orifice 50 extending between the chambers 46 and 48. Inlet and outlet ports 52 and 54 respectively extend through the housing 44 into the high pressure chamber 46 and low pressure chamber 48 respectively. A hollow bonnet 56 is mounted on the housing 44 across the low pressure chamber 48.

A valve plug 58 is in the high pressure chamber 46 and is connected by a rod 60 extending through the orifice 50 to a flexible diaphragm 62 which extends across the low pressure chamber 48. The valve plug 58 has a conical seating surface 64 facing the orifice 48 and a spring 66 is compressed between the valve plug 58 and the bottom of the high pressure chamber 46. The periphery of the flexible diaphragm 62 is clamped between the end of the housing 12 and the bonnet 56 and the diaphragm 62 separates the low pressure chamber 62 from the interior of the bonnet 56. A piston 68 is disposed inside the bonnet 56 and contacts the flexible diaphragm 62. The outer surface of the piston 68 slidably engages the inner surface of the bonnet 56 and an O-ring 70 is placed in a suitable groove 71 in the surface of the piston 68 adjacent the inner wall of bonnet 56 to effect a has tight seal therebetween. An adjustment stem 72 is threaded through the end of the bonnet 56 and has a knob, not shown, on the end thereof by which the stem 72 can be rotated. A spring 74 is compressed between the adjustment stem 72 and the piston 68.

The piston-backed, flexible diaphragm controlled regulator 42 operates in the same manner as the flexible diaphragm controlled regulator 10 previously described. However, any difference between the pressure in the low pressure chamber 48 and the force applied by the spring 74 causes both flexing of the flexible diaphragm 62 and sliding movement of the piston 68 to move the valve plug 58. As previously described, if the flexible diaphragm 62 ruptures, it is backed-up by the piston 68 to prevent flow of gas into the bonnet 56. However, the regulator 42 does not provide any indication that the flexible diaphragm 62 has ruptured and should be repaired.

Figure 3:
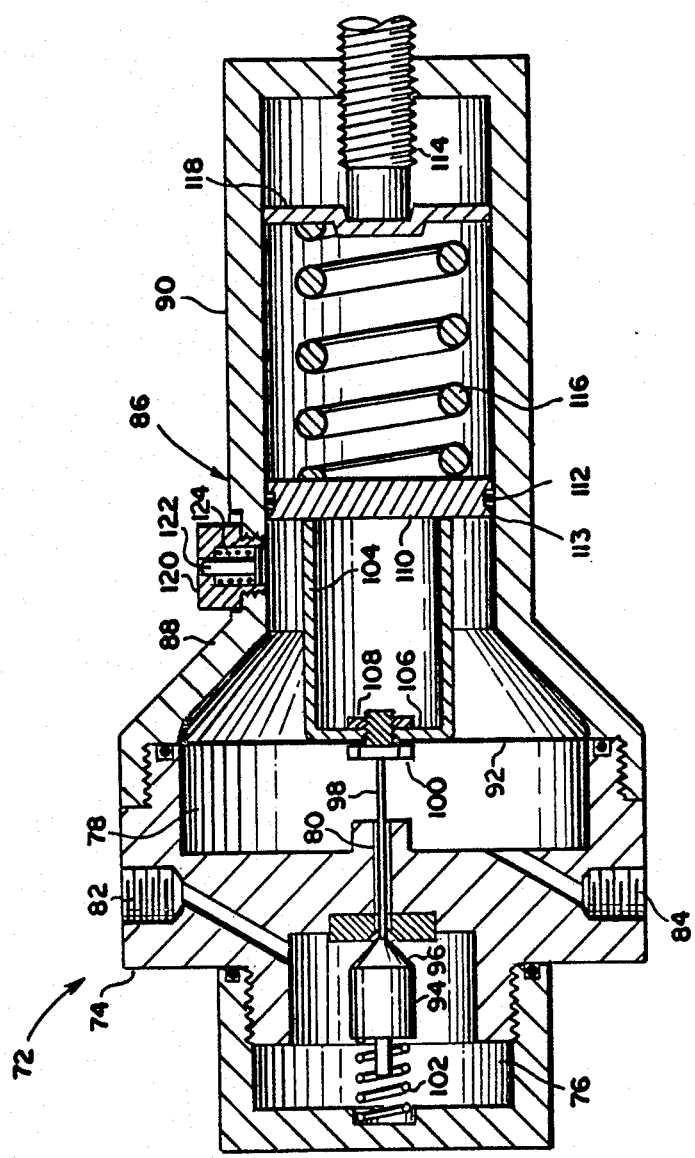
FIG. 3 is a sectional view of a form of a piston-backed, flexible diaphragm controlled pressure regulator incorporating the present invention

Referring to FIG. 3, a piston-backed, flexible diaphragm controlled regulator which incorporates the present invention is generally designated as 72. Regulator 72 includes a housing 74 having a high pressure chamber 76 and a low pressure chamber 78 spaced from the high pressure chamber 76. An orifice 80 extends between the high pressure chamber 76 and the low pressure chamber 78. Inlet and outlet ports 82 and 84 respectively extend through the housing 74 to the high pressure chamber 76 and low pressure chamber 78 respectively. A hollow bonnet 86 is mounted on the housing 74 over the low pressure chamber 78. The bonnet 86 has a conical portion 88, which is mounted on the housing 74 and a cylindrical portion 90 which projects from the smaller diameter end of the conical portion 88.

A flexible diaphragm 92 extends across the low pressure chamber 78 and has its periphery clamped between the housing 74 and the bonnet 86. The flexible diaphragm 92 separates the low pressure chamber 78 from the interior of the bonnet 86. A valve plug 94 is within the high pressure chamber 70 and has a conical seating surface 96 facing the orifice 80. A rod 98 extends through the orifice 80 and is connected at one end to the valve plug 94 and at its other end to the head of a bolt 100 which extends through the center of the flexible diaphragm 92. A spring 102 is compressed between the valve plug 94 and the bottom of the high pressure chamber 70.

A cup-shaped spacer 104 is mounted on the bolt 100 within the conical portion 88 of the bonnet 86 with the bolt 100 extending through the center of the bottom 106 of the spacer 104. A nut 108 is threaded on the bolt 100 and secures the spacer 104 to the flexible diaphragm 92. The spacer 104 extends away from the flexible diaphragm 92 into the cylindrical portion 90 of the bonnet 86. A rigid piston 110 is within the cylindrical portion 90 of the bonnet 86 with the periphery of the piston 110 having sliding engagement with the inner surface of the cylindrical portion 90. An O-ring 112 is disposed in a suitable groove or recess 113 in the periphery of the piston 110 to effect a gas tight seal between piston 110 and the inner surface of the cylindrical portion 90 of bonnet 86. An adjustment stem 114 is threaded through the bottom of the cylindrical portion 90 of the bonnet 86 and has a knob, not shown, on its end. A spring 116 is compressed between the piston 110 and a washer 118 on the end of the adjustment stem 114.

A poppet 120 projects through the wall of the bonnet 86 in the chamber formed between the flexible diaphragm 92 and the rigid piston 100. The poppet has a stem 122 which acts against a spring 124 and will pop-up beyond the wall of the bonnet 86 if a pressure builds up within the chamber between the flexible diaphragm 92 and the rigid piston 100 greater than the force of the spring 124.

The piston-backed, flexible diaphragm controlled regulator 72 of the present invention operates in the same manner as the piston-backed regulator 42 previously described. Rotating the adjustment stem 114 changes the force of the spring 116 on the rigid piston 110. Since the rigid piston 110 is connected to the flexible diaphragm 92 by the spacer 104, this same force is applied to the flexible diaphragm 92. If the pressure in the low pressure chamber 78 is less than the force applied by the spring 116, the valve plug 94 will be moved away from the orifice 80 allowing gas to flow from the high pressure chamber 70 to the low pressure chamber 78 and out of the regulator through the outlet port 84. If the pressure in the low pressure chamber 78 becomes too high, the force on the flexible diaphragm will move the valve plug 94 back toward the orifice 80, thereby either making the passage between the valve plug seating surface 96 and the orifice 80 smaller so as to decrease the pressure of the gas or closing the regulator 72 completely.

Figure 4:
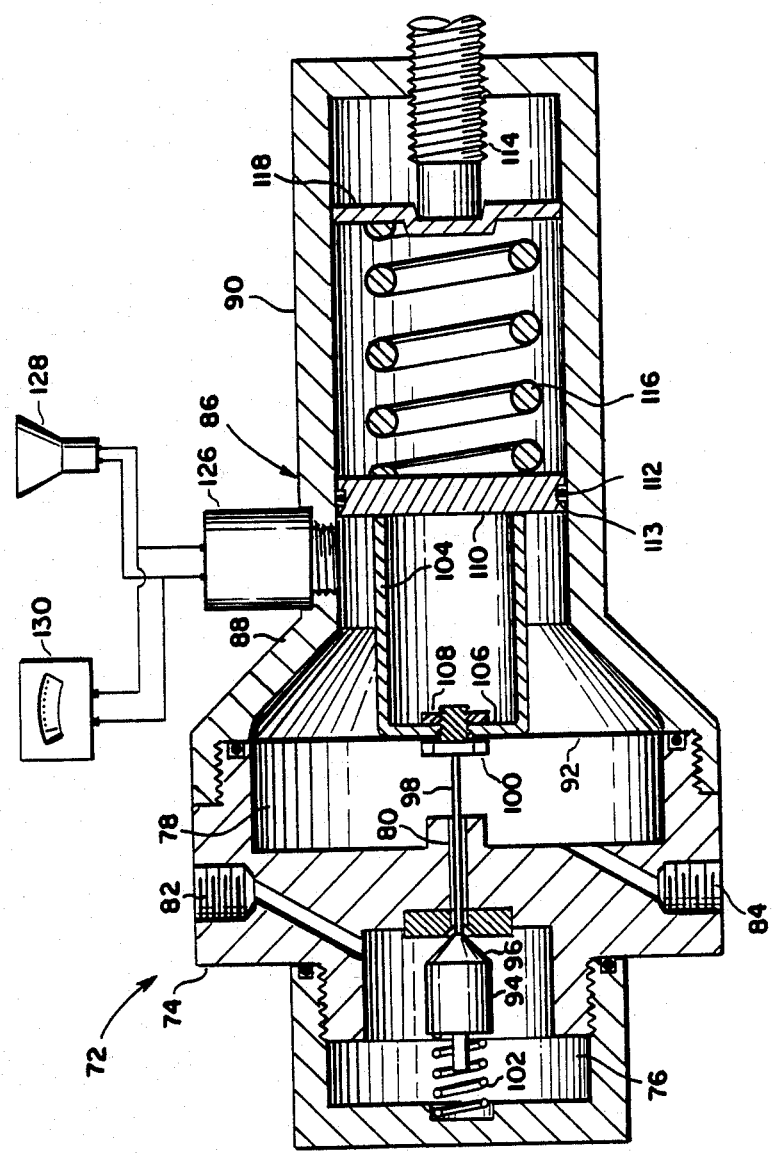
FIG. 4 is a sectional view similar to FIG. 3 showing another form of pressure sensing device.

If the flexible diaphragm 92 ruptures for some reason, the gas will flow through the rupture into the chamber between the flexible diaphragm 92 and the solid piston 110. The piston 110 will then stop the flow of the gas into the bonnet 90 where it may escape into the atmosphere. The pressure in the chamber between the diaphragm 92 and the piston 110 is being continuously monitored by the poppet 120, which is a pressure sensing device. Any increase in pressure in the chamber between the diaphragm 92 and piston 110 as a result of leakage through a rupture in the diaphragm 92 will cause the stem 122 of the poppet 120 to pop-up providing a visual indication of a problem. The user can than initiate an orderly shutdown to repair the regulator without loss of any of the gas being regulated. Although the regulator 72 has been shown as having a poppet 120 to indicate the pressure in the chamber between the diaphragm 92 and piston 110, other types of pressure sensing devices can be used, such as Bourden type pressure gauges, electrical pressure switches or electrical pressure transducers. FIG. 4 shows a regulator 72 having an electrical pressure sensing device 126 projecting through the wall of the bonnet 86 in the chamber formed between the flexible diaphragm 92 and the rigid piston 100. The electrical pressure sensing device 126 can be provided with audio signal means 128 as well as visual signal means 130 to indicate rupture of the diaphragm 92.

Thus, there is provided by the present invention a pressure regulator in which the flexible diaphragm 92 is backed-up by a rigid piston 110 so that if the flexible diaphragm 92 ruptures any gas leaking through the rupture will not flow out of the regulator. In addition, the regulator of the present invention provides a chamber between the flexible diaphragm 92 and the rigid piston 110 for collecting any gas which may leak through a rupture in the flexible diaphragm 92 and a pressure sensing device in the chamber to indicate that gas has leaked into the chamber as a result of a rupture of the diaphragm 92. This allows for an orderly shutdown of the regulator 72 for repair of the diaphragm 92 without loss of the gas being regulated. Also, it prevents loss of the gas into the atmosphere, which could be dangerous if the gas is toxic or flammable.

What is desired to be secured by Letters Patent of the United States is set forth in the appended claims.

What is claimed is:

1. In a gas pressure regulator which includes a housing having a high pressure chamber, a low pressure chamber, an orifice extending between the high pressure chamber and the low pressure chamber, a bonnet mounted across an end of the low pressure chamber, a valve plug in the high pressure chamber adapted to move toward and away from the orifice to open and close the regulator, and means across the low pressure chamber and connected to said valve plug for moving the valve plug toward and away from the orifice, the improvement comprising:

the means for moving said valve plug includes a flexible diaphragm secured across the low pressure chamber to separate the low pressure chamber from the bonnet, a rigid piston sealingly mounted across the bonnet spaced from the flexible diaphragm and forming a chamber therebetween, means connecting the rigid piston to said flexible diaphragm so that they move together, and means in the chamber between the diaphragm and piston for indicating any leakage across said flexible diaphragm without allowing the leakage to escape from the chamber to the atmosphere.

2. A gas pressure regulator in accordance with claim 1 in which the rigid piston extends across the bonnet with the periphery of the piston slidably engaging the inner surface of the bonnet, and sealing means between the piston and the inner surface of the bonnet.

3. A gas pressure regulator in accordance with claim 2 in which the bonnet has a cylindrical portion and the piston is in the cylindrical portion.

4. A gas pressure regulator in accordance with claim 2 in which the means connecting the piston to the flexible diaphragm includes a spacer secured to said flexible diaphragm and extending along said bonnet to engage the piston.

5. A gas pressure regulator in accordance with claim 4 including an adjustment knob threaded through the bonnet and a spring compressed between the adjustment knob and the piston urging the piston against the spacer.

6. A gas pressure regulator in accordance with claim 2 in which the means for indicating leakage across the flexible diaphragm is a pressure sensor in the bonnet at the chamber between the flexible diaphragm and the piston.

7. A gas pressure regulator in accordance with claim 6 in which the pressure sensor provides a visual indication of a change in pressure in the chamber between the flexible diaphragm and the piston.

8. A gas pressure regulator in accordance with claim 7 in which the pressure sensor is a poppet having a stem which pops out of the bonnet when there is an increase in pressure in the chamber between the flexible diaphragm and the piston.

9. A gas pressure regulator in accordance with claim 8 in which the pressure sensor provides an electrical signal which operates an indicating means.

* * * * *